H. P. McMILLAN & R. R. ROANE.
TRANSMISSION GEARING FOR AUTOMOBILES.
APPLICATION FILED FEB. 24, 1914.

1,189,209.

Patented June 27, 1916.
2 SHEETS—SHEET 1.

WITNESSES:
A. E. Eader
G. Ferd. Vogt

INVENTORS.
H. P. McMillan
R. R. Roane
By Mann & Co.
ATTORNEYS.

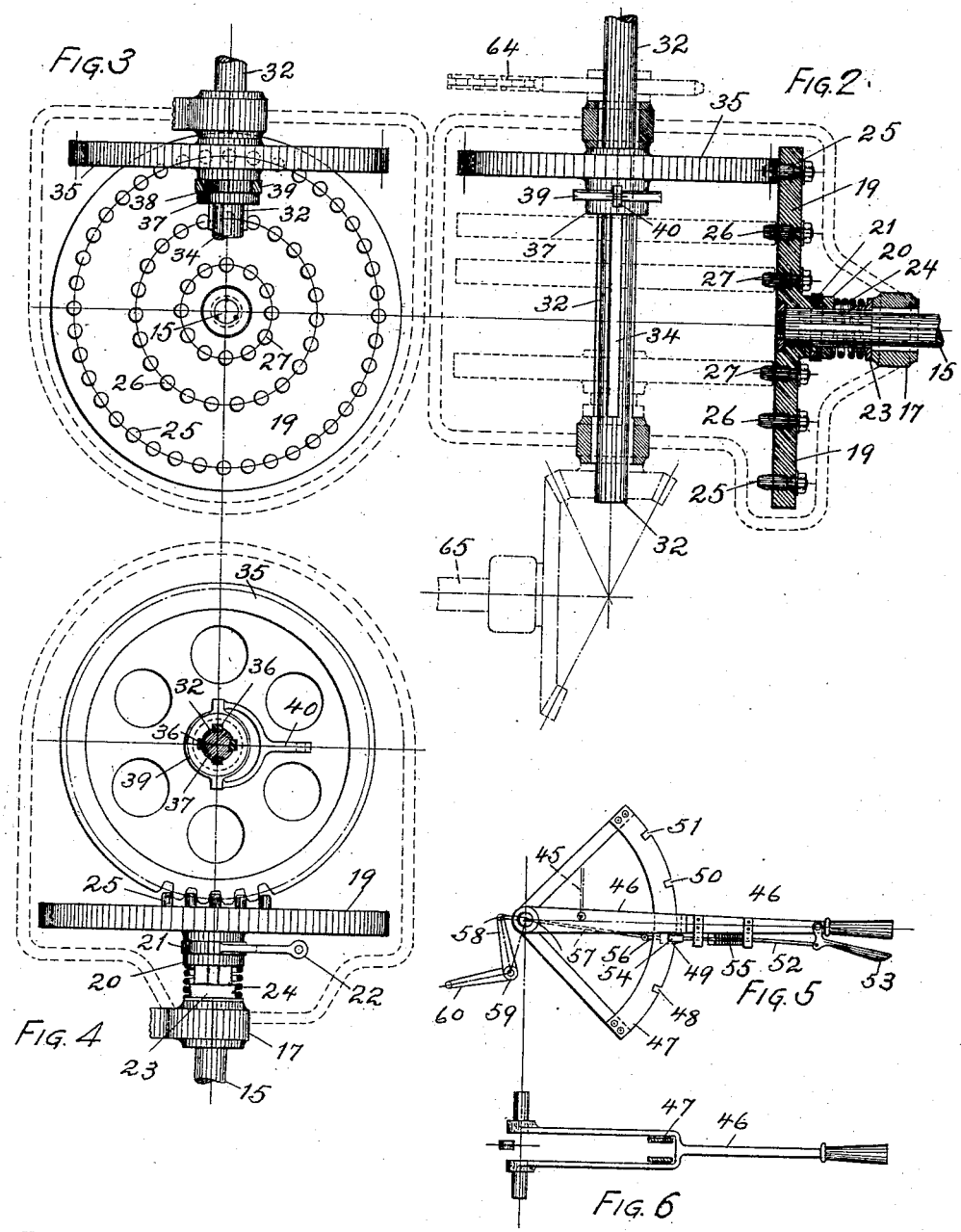

UNITED STATES PATENT OFFICE.

HUGH P. McMILLAN AND ROBERT R. ROANE, OF BALTIMORE, MARYLAND; SAID ROANE ASSIGNOR TO SAID McMILLAN.

TRANSMISSION-GEARING FOR AUTOMOBILES.

1,189,209.  Specification of Letters Patent.  Patented June 27, 1916.

Application filed February 24, 1914. Serial No. 820,503.

*To all whom it may concern:*

Be it known that we, HUGH P. McMILLAN and ROBERT R. ROANE, citizens of the United States, residing at Baltimore, in the State of Maryland, have invented certain new and useful Improvements in Transmission-Gearing for Automobiles, of which the following is a specification.

This invention relates to an improved transmission gearing especially designed for use on automobiles and has for its object to provide an exceedingly simple and improved form of transmission together with an improved form of actuating mechanism therefor, whereby a change of speed or a reversal of the direction of travel may be readily effected with a minimum liability of damage to the mechanisms.

Figure 1:
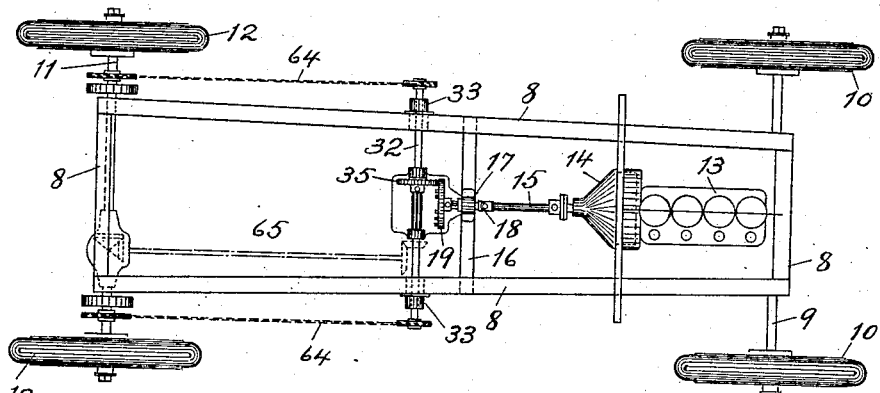
Figure 7:
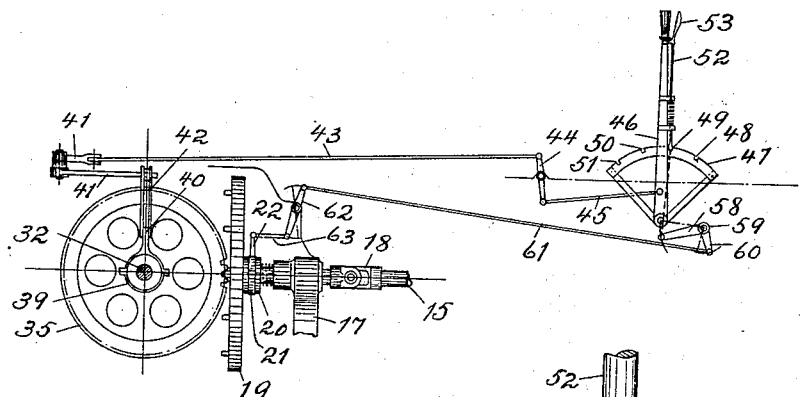
Figure 8:
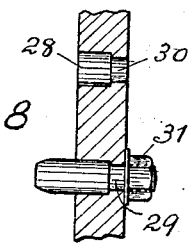
Figure 9:
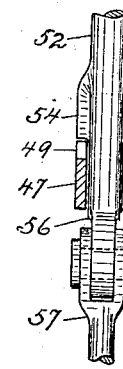

The invention is illustrated in the accompanying drawings wherein,

Figure 1 shows a top plan view of the running gear or chassis of an automobile to which the improved transmission is attached. Fig. 2, illustrates an enlarged sectional plan of the transmission. Fig. 3, shows the same in rear elevation. Fig. 4, illustrates the transmission gearing as viewed from one end. Fig. 5, shows an enlarged detail of the actuating devices for the transmission mechanism. Fig. 6, illustrates a front elevation of the actuating lever. Fig. 7, shows the transmission, the lever devices and the connections between the same. Fig. 8, illustrates a sectional detail through a portion of the transmission head or plate which carries the detachable teeth and shows the means of attaching said teeth, and Fig. 9, shows a detail of the locking means on the latch bar and the central stem with which the operating levers are connected.

Referring to the drawings by numerals, 8, designates the frame of an automobile having the usual front axle, 9, and wheels 10, and provided with a rear driving axle, 11, and wheels, 12. An engine, 13, of any desired form is provided as usual at the front of the frame, and a clutch device, 14, is interposed between the engine and driving shaft, 15, which clutch is to be actuated by a foot treadle, not shown, but located in the car as is customary. A cross-bar, 16, connects the two side bars of the frame and a bearing, 17, is mounted on said cross-bar and supports the driving shaft, 15,—the latter being provided with a flexible or yielding joint, 18, to accommodate the shaft to twisting strains to which the frame is subjected when the car is in use.

The rear end of the driving shaft, 15, beyond the flexible joint 18, carries a circular head or plate, 19, which is secured thereon by a spline and feather connection so as to lock it to the shaft against independent rotation but to permit the head or plate to have a comparatively slight movement in a direction longitudinally of the shaft. This head or plate has an integral circular boss, 20, at one side with an annular circumferential groove around the exterior thereof, and a strap, 21, extends around and is seated in said boss-groove and has a yoke arm, 22, projecting laterally therefrom, for a purpose presently to be described.

A sleeve or collar, 23, is loosely confined on the driving shaft and the rear of the flexible joint 18, and between the boss and the bearing, 17, and a coiled spring, 24, encircles the shaft and has one end seated against the boss and its other end seated against the said collar, so as to normally press the head or plate rearwardly on and toward the end of the driving shaft and away from the bearing, 17.

The head or plate, 19, is provided with a series of concentric rows of teeth, 25, 26, and, 27, respectively. In the present instance these teeth are seated in sockets, 28, in the rear face of the head or plate, and have reduced ends, 29, that project through perforations, 30, which extend from the sockets through the head and open on the forward side of said head. The reduced ends of the teeth have exterior screw-threads so that nuts, 31, may be screwed thereon and rigidly hold the teeth in the sockets, as shown in detail in Fig. 8, of the drawing.

While in the present instance three concentric rows of teeth are shown on the head or plate, 19, it is obvious that the number of rows may be varied if desired. At the rear of the head, 19, there is provided a horizontal shaft, 32, whose ends are sustained in bearings, 33, that are carried on the side bars of the frame, 8. This shaft extends at right angles to the driving shaft, 15, and is provided with longitudinal grooves, 34, of a length greater than the radius of the head, 19. A gear wheel, 35, is carried on the shaft, 32, and is held thereto by means of keys or feathers, 36, which coact between the grooves and wheels and by means of which said wheel may be moved on the shaft in a direction lengthwise of the latter. A collar or boss, 37, is provided on one side of the gear wheel and said collar has an exterior annular groove, 38, in which a circumferential strap, 39, is engaged. This strap has a laterally-extending arm, 40, for a purpose which will presently be explained.

From the foregoing explanation it will be seen that shaft, 32, on which the gear, 35, is mounted, extends in a direction at right angles to and crosswise of the axis of the driving axle, 15, and the head, 19, on the latter. It will also be noted that the gear, 35, is fixed against independent rotary motion of the shaft, 32, but is capable of longitudinal movement on said shaft. It will further be seen that the head or plate, 19, on the driving shaft is capable of movement on the latter so as to be moved toward or from the slidable gear, 35, so that the teeth, 25, 26, and, 27, may be moved with the head and thus be drawn away from the path of the teeth on the sliding gear.

By referring to Fig. 7 of the drawing it will be noted that arm, 40, of strap, 39, is connected to a rock-arm, 41, by means of rods, 42, and that rock-arm, 41, is actuated by a bar, 43, lever, 44, and rod, 45,—the latter being pivotally connected to an actuating lever, 46. By means of these connections the rocking of the actuating lever, 46, by hand, and toward the rear, will cause arm, 41, to swing laterally and move arm, 40; strap, 39, and gear, 35, longitudinally on shaft, 32, so as to move said gear into alinement with any one of the rows, 25, 26, or, 27, of teeth on the head or plate, 19.

It will also be noted by reference to Figs. 5, 6 and 7, of the drawing that actuating lever, 46, has a bifurcated lower end which straddles sector bars, 47, and that said sector-bars have notches 48, 49, 50, and 51, in their upper edges. A latch bar, 52, is carried at the front side of actuating bar, 46, and said latch bar is provided with a grip lever, 53, adjacent to the handle of said actuating bar. The lower end of latch bar has a cross leg or bolt, 54, which will seat in any one of the notches in the sector bars, 47, with which it may be brought into register, and a spring, 55, serves to keep the lug or bolt, 54, pressed toward the sector bars. A central stem, 56, depends from the latch bar and projects downwardly between the sector bars, and a link bar, 57, depends from said stem and has its lower end pivotally engaged with an arm, 58, of a bell-crank lever, 59. The other arm, 60, of said bell-crank lever is pivotally connected to the forward end of a connecting rod, 61, while the rear end of said rod is pivotally attached to one end of a rock bar, 62. This rock bar is pivotally mounted adjacent to the yoke arm, 22, of the strap, 21, that is carried in the groove of bar, 20, on the head or plate, 19, and a link, 63, pivotally connects the rock bar with the yoke arm.

From the foregoing explanation it will be seen when grasping actuating lever handle to effect a shifting of gear, 35, the operator must first rock grip lever, 53, of latch bar, 52, to disengage lug or bolt, 54, from the notch in the sector bars which said lug engages. This rocking action of grip lever, 53, causes bar, 52; stem, 56, and link-bar, 57, to move upwardly and thereby move bell-crank arm, 58, up and swing bell-crank arm, 60, rearwardly. As connecting rod, 61, is attached to the bell-crank arm, 60, it will be given a rearward longitudinal stroke which results in rocking bar, 62, so as to draw link, 63; yoke arm, 22; boss, 20, and head or plate, 19, forwardly on the driving shaft, 15. This forward movement of head or plate, 19, in the driving shaft compresses spring, 24, and also withdraws that circular row of teeth on the head which are in engagement with the gear, 32, away from said gear. This withdrawal of the teeth from gear, 32, is therefore effected by the movement of grip lever, 53, in the act of releasing the lug or bolt from the sector notches, and prior to the actual movement of actuating bar, 46. When therefore, bar, 46, is actually moved to shift gear, 35, the head or plate, 19, will have first been moved so as to withdraw the teeth from the gear. When the gear has been moved to the desired position, which is determined by the several notches in the sector plate, the clutch, 14, will be released by the usual foot treadle (not shown) to momentarily disconnect the shaft, 15, from the engine, and when grip lever, 53, is released, the spring, 24, will move head, 19, rearwardly so that another row of its teeth will engage the previously shifted gear, 32, thereby effecting a change of gear.

It is immaterial what means is employed to utilize the power imparted to the driven shaft, 32, for obviously a chain and sprocket drive, 64, may be employed or a shaft drive, 64, may be employed or a shaft drive, 65, may be utilized, either of which may readily connect the driven shaft with the rear axle, 11, as shown in Fig. 1 of the drawing.

Having thus described our invention what we claim and desire to secure by Letters Patent is:—

1. The combination with a frame, of a motor; a driving shaft extending lengthwise of the frame from the motor and having a flexible joint near its rear end; a circular plate on the rear end of the driving shaft beyond the flexible joint, said plate provided with concentric rows of teeth and having movement longitudinally of the shaft and provided with a circular boss at one side with an annular groove around the boss; means engaging the circular boss for moving the latter and plate lengthwise on the driving shaft; a spring on the shaft between the flexible joint and boss to yieldingly press the plate rearwardly on the shaft; a driven shaft extending at right angles to the driving shaft; a gear on the driven shaft and means for moving the gear lengthwise of the driven shaft to engage its teeth with one row of teeth at a time on the circular plate.

2. The combination with a driving shaft, of a driven shaft extending at right-angles to the driving shaft; a circular plate carried by the driving shaft and having rows of concentrically-arranged teeth thereon; a gear on the driven shaft to mesh with one row of said teeth at a time,—said circular plate and gear being movable lengthwise of the respective shafts which carry them; an actuating lever; a locking bar for said lever; means for connecting the locking bar with the circular plate and means for connecting the gear with the actuating lever.

3. The combination with a driving shaft, of a driven shaft extending at right angles to the driving shaft; a circular plate carried by the driving shaft and having rows of concentrically-arranged teeth thereon; a gear on the driven shaft to mesh with one row of said teeth at a time,—said circular plate and gear being movable lengthwise of the respective shafts which carry them; a sector bar having notches thereon; an actuating lever adjacent to the sector bar; a locking bar carried by and movable with the actuating bar and engaging the notches in the sector bar; means for connecting the locking bar with the circular plate whereby to move the latter on the driving shaft when the locking bar is released and means for connecting the actuating lever with the gear whereby to move the latter on the driven shaft after the locking bar has been released and the circular head has been moved thereby.

In testimony whereof I affix my signature in presence of two witnesses.

HUGH P. McMILLAN.
ROBERT R. ROANE.

Witnesses:
G. FERD. VOGT,
LOUIS C. KLERLEIN.

Copies of this patent may be obtained for five cents each, by addressing the "Commissioner of Patents, Washington, D. C."